United States Patent [19]

Masumoto et al.

[11] Patent Number: 4,695,620

[45] Date of Patent: Sep. 22, 1987

[54] COPOLYCARBONATE RESIN FROM BRANCHED CHAIN ALKYLENE BIS PHENOL

[75] Inventors: Mituhiko Masumoto; Shigeo Yanada; Tadami Kinugawa, all of Osaka, Japan

[73] Assignee: Mitsubishi Gas Chemical Company, Inc., Tokyo, Japan

[21] Appl. No.: 853,062

[22] Filed: Apr. 17, 1986

[30] Foreign Application Priority Data

Apr. 17, 1985 [JP] Japan .................................. 60-81592

[51] Int. Cl.⁴ ............................................ C08G 63/62
[52] U.S. Cl. ................................... 528/204; 528/125; 528/128; 528/171; 528/174; 528/196
[58] Field of Search ............... 528/204, 196, 125, 128, 528/171, 174

[56] References Cited

U.S. PATENT DOCUMENTS 4,446,285  5/1984  Mark et al. ......................... 528/204

*Primary Examiner*—Harold D. Anderson
*Attorney, Agent, or Firm*—Sughrue, Mion, Zinn, Macpeak and Seas

[57] ABSTRACT

A polycarbonate resin having an improved flexibility, flowability and heat resistance, and a process for producing such polycarbonate resins are disclosed. The polycarbonate resin of this invention is particularly useful as optical articles and other precision molding materials and is produced by a solution polymerization method using a bisphenol compound and a substituted alkylenebisphenol compound.

4 Claims, No Drawings

COPOLYCARBONATE RESIN FROM BRANCHED CHAIN ALKYLENE BIS PHENOL

FIELD OF THE INVENTION

This invention relates to novel copolycarbonate resins excellent in flexibility, flowability, and heat resistance and to a process for producing the same. The copolycarbonate resin according to the present invention can be suitably used in various applications such as optical shaped articles and other precision shaped materials, general molding materials and raw materials therefor, films, sheets, etc., in view of its excellent characteristics.

BACKGROUND OF THE INVENTION

Polycarbonate resins have hitherto been known to be excellent materials in view of their heat resistance, transparency, mechanical strength, electrical characteristics and non-toxicity, but have disadvantages of insufficient flowability.

Processes which have been proposed to improve flowability include a process of adding a plasticizer to a polycarbonate resin, as disclosed, e.g., in Japanese Patent Publication Nos. 39941/70 and 4100/73, etc., and a process of using a fatty acid having an aliphatic long-chain alkyl group or its chloride or a long chain alkylphenol, etc. which exhibits a plasticizing effect as a molecular weight-controlling agent for a terminating agent, as disclosed in Japanese Patent Publication No. 50078/77.

The process of using a plasticizer improves flowability of a polycarbonate resin but involves vaporization of the plasticizer with a particular odor during molding. The vapors of the plasticizer are attached to a mold upon condensation and transferred to molded products, resulting in poor appearance of molded products, and cause deterioration of working environment due to the odor and other various problems. Further, the process of introducing a long chain alkyl group into a molecule terminal is free from disadvantages such as odor as is encountered in the use of a plasticizer and can attain a fairly improved flowability of a polycarbonate resin. However, since the amount of the long chain alkyl group that may be introduced to the terminal is limited, a satisfactory improvement of flowability cannot be expected.

SUMMARY OF THE INVENTION

As a result of extensive studies in order to overcome the above-described disadvantages, it was found that the use of a substituted alkylene bisphenol as a part of dihydric phenol compounds provides a polycarbonate copolymer having an improved flexibility and flowability and having a low deterioration of heat resistance. The present invention has been completed based on this finding.

DETAILED DESCRIPTION OF THE INVENTION

The present invention relates to a copolycarbonate resin having, as constituting units, the following formulae A and B, and also to an improved process for producing the copolycarbonate resin having an improved flexibility, which comprises reacting a dihydric phenol compound with phosgene or a polycarbonate precursor by a solution method, wherein the dihydric phenol compound is a bisphenol represented by the following formula (1) and a substituted alkylene bisphenol represented by the following formula (2).

Formula A:

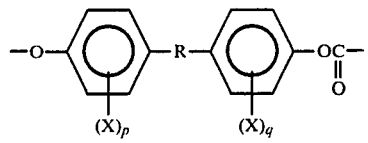

(A)

Formula B:

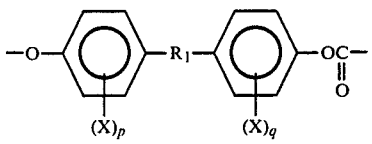

(B)

Formula 1:

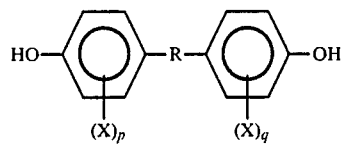

(1)

Formula 2:

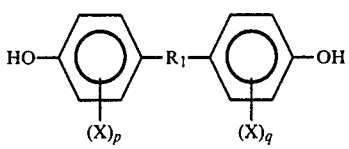

(2)

wherein R represents a divalent aliphatic, alicyclic, or phenyl-substituted alkylidene group each having 1 to 15 carbon atoms, or —O—, —S—, —SO—, —SO$_2$—, or —CO—; R$_1$ is an aliphatic organic group represented by —CH(CH$_3$)—CH$_2$—C(CH$_3$)$_2$—, —C(CH$_3$)=CH—C(CH$_3$)$_2$—, —C(=CH$_2$)—CH$_2$—C(CH$_3$)$_2$—, —CH(CH$_3$)—CH=CH—, or —CH(CH$_3$)—CH$_2$—CH$_2$—; X represents a halogen atom or a lower alkyl group, and p and q each represents an integer of 0 to 2.

In a preferred embodiment of this invention, the substituted alkylene bisphenol of the formula (2) is used in an amount in the range of from 5 to 50 mol% based on the total amount of dihydric phenol compound used.

The substituted alkylene bisphenol represented by the formula (2) above which is a characteristic feature of this invention is generally obtained as a dimer of parahydroxystyrene, a dimer of para-hydroxy-α-methylstyrene, or a hydrogenated dimer thereof, separated from the mixture resulting from the oligomerization of para-hydroxystyrene or para-hydroxy-α-methylstyrene. From the standpoint of heat stability, the hydrogenated dimer is preferred.

Examples of the dihydric phenol compound represented by the formula (1) which is copolymerized with the substituted alkylenebisphenol represented by the formula (2) include bis(4-hydroxyphenyl)methane, bis(4-hydroxyphenyl)ether, bis(4-hydroxyphenyl)sulfone, bus(4-hydroxyphenyl)sulfoxide, bis(4-hydroxyphenyl)sulfide, bis(4-hydroxyphenyl)-ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane. Of these compounds, 2,2-bis(4-hydroxyphenyl)propane and 1,1-bis(4-hydroxyphenyl)cyclohexane are particularly preferred from the standpoint of heat stability.

The production of a polycarbonate resin according to the present invention can be carried out by a conventionally known solution process, such as an interfacial polymerization process or a pyridine process except for using the above substituted alkylene bisphenol of the formula (2) as a part of dihydric phenol compounds to be used. More specifically, the interfacial polymerization process comprises reacting the dihydric phenol compounds of the formulae (1) and (2) and a molecular weight-controlling agent with phosgene in an inert organic solvent in the presence of an alkaline aqueous solution and, after completion of the reaction, adding a tertiary amine or a quaternary ammonium salt as a polymerization catalyst to effect interfacial polymerization to obtain a copolycarbonate resin. The pyridine process comprises dissolving the dihydric phenol compounds of the formulae (1) and (2) and a molecular weight-controlling agent in pyridine or a mixed solvent of pyridine and an inert solvent and blowing phosgene into the solution to directly obtain a copolycarbonate resin.

In the above-described solution process, solubility of the dihydric phenol of the formula (1) in an inert solvent may be insufficient depending on the type of dihydric phenol used and/or the proportion thereof. Such being the case, it is preferable that the dihydric phenol of the formula (1) and phosgene are reacted first, and then the dihydric phenol of the formula (2) is added, or vise versa, i.e., the dihydric phenol of the formula (2) and phosgene are reacted first and then the dihydric phenol of the formula (1) is added, or the reaction is carried out in a dilution system.

The inert solvent which can be used in the polymerization reaction includes chlorinated hydrocarbons, e.g., dichloromethane, 1,2-dichloroethane, 1,1,2,2-tetrachloroethane, chloroform, 1,1,1-trichloroethane, carbon tetrachloride, monochlorobenzene, dichlorobenzene, etc.; aromatic hydrocarbons, e.g., benzene, toluene, xylene, ethylbenzene, etc., and ether compounds, e.g., diethyl ether, etc. These organic solvents can be used alone or in combination of two or more thereof. If desired, the above-enumerated water-immiscible solvents may be used in admixture with water-miscible solvents, such as ethers other than those described above, ketones, esters, nitriles, and the like as long as the mixed solvent system is not completely compatible with water.

The molecular weight-controlling agent which can be used in the present invention are conventionally known monohydric aromatic hydroxyl compounds including m- or p-methylphenol, m- or p-propylphenol, p-bromophenol, tribromophenol, p-t-butylphenol, etc., and long chain alkyl ether phenols, long chain alkyl ester phenols, long chain alkyl acid chlorides, etc.

The polymerization catalyst includes known tertiary amines and quaternary ammonium salts. Specific examples thereof are tertiary amines, e.g., trimethylamine, triethylamine, tributylamine, tripropylamine, trihexylamine, tridecylamine, N,N-dimethylcyclohexylamine, pyridine, quinoline, dimethylaniline, etc.; and quaternary ammonium salts, e.g., trimethylbenzylammonium chloride, tetramethylammonium chloride, triethylbenzylammonium chloride, etc.

In the present invention, a trifunctional organic compound having phenolic hydroxyl groups may be used in combination with the above-described dihydric phenol compounds to prepare a branched polycarbonate resin. The trifunctional organic compound which can be used includes polyhydroxyl compounds such as phloroglucinol, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzol, 1,1,1-tri(4-hydroxyphenyl)ethane, 2,6-bis(2-hydroxy-5-methylbenzyl)-4-methylphenol, α,α',α''-tri(4-hydroxyphenyl)-1,3,5-triisopropylbenzene, etc.; 3,3-bis(4-hydroxyaryl)oxyindole (i.e., isatin bisphenol); 5-chloroisatin bisphenol; 5,7-dichloroisatin bisphenol; 5-bromoisatin bisphenol; etc. Particularly preferred trifunctional organic compounds are 2,6-dimethyl-2,4,6-tri(4-hydroxyphenyl)heptene-3 and 4,6-dimethyl-2,4,6-tri(4hydroxyphenyl)heptene-2. These trifunctional organic compounds can usually be used in an amount from 0.01 to 3 mol%, and preferably from 0.1 to 1.0 mol%, based on the total amount of the dihydric phenol compounds of the formulae (1) and (2).

Flowability of the copolycarbonate resin prepared by the process of this invention during molding principally depend on the molecular weight of the resulting resin, and the proportion of the substituted alkylene bisphenol of the formula (2) and the dihydric phenol of the formula (1). In other words, resins having desired flowability and heat resistance can be obtained by appropriately selecting and combining the amount of a molecular weight-controlling agent to be added, and amount of the alkylene bisphenol (2) to be added.

In the present invention, the proportion of the substituted alkylenebisphenol of the formula (2) used in the production of copolycarbonate is preferably in the range of from 1 to 95 mol% based on the total amount of dihydric phenol compounds. In particular, the use of the substituted alkylene bisphenol (2) in the range of from 5 to 50 mol% is preferred from the standpoint of improving the flowability while retaining excellent heat resistance of the polycarbonate resins.

In producing optical articles by injection molding from the copolycarbonate resins according to the present invention, the viscosity of the copolycarbonate resin is preferably adjusted to have an intrinsic viscosity [$\eta$] in the range of from 0.3 to 0.8 as determined in a methylene chloride solvent at 25° C. from the standpoint of flowability.

The present invention is hereinafter illustrated in greater detail by referring to the following Examples and Comparative Examples, but they are not construed to be limiting the present invention.

COMPARATIVE EXAMPLE 1

In 42 liters of water was dissolved 3.7 Kg of sodium hydroxide, and while maintaining the solution at 20° C., 7.3 Kg of 2,2-bis(4-hydroxyphenyl)propane (BPA) and 8 g of hydrosulfite was dissolved therein.

To the resulting solution was added 28 liters of methylene chloride. While stirring, 180 g of p-t-butylphenol (TBP) was added thereto, and then 3.5 Kg of phosgene was blown thereinto over 60 minutes.

After completion of the blowing of phosgene, the reaction mixture was emulsified by vigorously stirring. After emulsification, 8 g of triethylamine was added thereto. The stirring was continued for about 1 hour to effect polymerization.

The polymerization mixture was separated into an aqueous phase and an organic phase. The organic phase was neutralized with phosphoric acid and then repeatedly washed with water until the washing became neutral. Thirty-five liters of isopropanol was added thereto precipitate the polymer. The precipitate was collected by filtration and dried to obtain a white powdery polycarbonate resin.

The resulting resin was tested for intrinsic viscosity, flowability and glass transition temperature, and the results obtained are shown in Table 1.

COMPARATIVE EXAMPLE 2

The same procedure as described in Comparative Example 1 was repeated except that the dihydric phenol (BPA) used was replaced by 8.6 Kg of 1,1-bis(4-hydroxyphenyl)cyclohexane (BPZ). The results obtained are shown in Table 1.

EXAMPLE 1

In 42 liters of water was dissolved in 3.7 Kg of sodium hydroxide. To the aqueous solution were dissolved 6.57 Kg of BPA, 0.80 Kg of 4-methyl-2,4-bis(4-hydroxyphenyl)-1-pentene (LD Dimer) and 8 g of hydrosulfite while maintaining at 20° C. To the resulting solution was added 28 liters of methylene chloride, and 180 g of TBP was added thereto with stirring. Then, 3.5 Kg of phosgene was blown into the mixture over a period of 60 minutes.

After completion of the blowing of phosgene, the reaction mixture was emulsified by vigorously stirring. After emulsification, 8 g of triethylamine was added thereto, and the stirring was continued for about 1 hour to effect polymerization.

The polymerization mixture was separated into an aqueous phase and an organic phase. The organic phase was neutralized with phosphoric acid and repeatedly washed with water until the washing became neutral. Thirty-five liters of isopropanol was added thereto to precipitate the polymer, and the precipitate was collected by filtration and dried to obtain a white powdery polycarbonate resin. The resulting resin was tested, and the results obtained are shown in Table 1.

EXAMPLE 2

The procedure as described in Example 1 was repeated but using 5.84 Kg of BPA and 1.72 Kg of LD Dimer. The results obtained are shown in Table 1.

EXAMPLE 3

The procedure as described in Example 1 was repeated but using 7.24 Kg of 1,1-bis(4-hydroxyphenyl)cyclohexane (BPZ) instead of BPA. The results obtained are shown in Table 1.

EXAMPLE 4

The procedure as described in Example 1 was repeated but using 0.86 Kg of 2-methyl-2,4-bis(4-hydroxyphenyl)pentane (LDH Dimer) instead of LD Dimer. The results obtained are shown in Table 1.

EXAMPLE 5

The procedure as described in Example 2 was repeated but using 1.73 Kg of LDH Dimer instead of LD Dimer. The results obtained are shown in Table 1.

EXAMPLE 6

The procedure as described in Example 3 was repeated but using 0.86 Kg of LDH Dimer instead of LD Dimer. The results obtained are shown in Table 1.

TABLE 1

| Example and Comparative Example | Compound of Formula (1) | | Compound of Formula (2) | | $[\eta]$** dl/g | Q Value*** $\times 10^{-2}$ cc/sec | Glass Transition Temperature °C. |
| --- | --- | --- | --- | --- | --- | --- | --- |
| | Compound* | mol % | Compound | mol % | | | |
| Comparative Example 1 | BPA | 100 | — | — | 0.48 | 9 | 149 |
| Comparative Example 2 | BPZ | 100 | — | — | 0.39 | 0.8 | 172 |
| Example 1 | BPA | 90 | LD Dimer | 10 | 0.46 | 18 | 140 |
| Example 2 | BPA | 80 | LD Dimer | 20 | 0.44 | 33 | 135 |
| Example 3 | BPZ | 90 | LD Dimer | 10 | 0.38 | 2.4 | 165 |
| Example 4 | BPA | 90 | LDH Dimer | 10 | 0.47 | 27 | 142 |
| Example 5 | BPA | 80 | LDH Dimer | 20 | 0.45 | 48 | 137 |
| Example 6 | BPZ | 90 | LDH Dimer | 10 | 0.39 | 3.5 | 168 |

Notes:
*BPA: 2,2-bis(4-hydroxyphenyl)propane BPZ: 1,1-bis(4-hydroxyphenyl)cyclohexane LD Dimer: 4-methyl-2,4-bis(4-hydroxyphenyl)-1-pentene LDH Dimer: 2-methyl-2,4-bis(4-hydroxyphenyl)pentane
**$[\eta]$: Intrinsic viscosity as determined in a methylene chloride solution at 25° C.
***Q value: Melt viscosity as determined by a flow tester and expressed in terms of the amount of the molten resin effused from a nozzle having a diameter of 1 mm and a length of 10 mm under a pressure of 160 Kg/cm$^2$ at 280° C.

As is apparent from the results shown in Table 1, the copolycarbonate resins prepared by the process according to the present invention have greatly improved flowability with a reduced melt viscosity as compared with conventional polycarbonate resins. Therefore, the present invention facilitates molding of polycarbonate resins which has been conventionally difficult and makes it possible to lower a molding temperature in ordinary molding. Thus, the resins are remarkably prevented from thermal decomposition during molding and provide molding materials suitable for precision molding, and the like, and are useful for forming various polycarbonate products such as films and sheets.

While the invention has been described in detail and with reference to specific embodiments thereof, it will be apparent to one skilled in the art that various changes and modifications can be made therein without departing from the spirit and scope thereof.

What is claimed is:

1. A copolycarbonate resin having, as constituting units, units of the following formulae A and B:

(A) 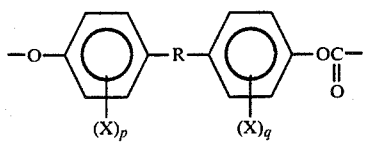

(B) 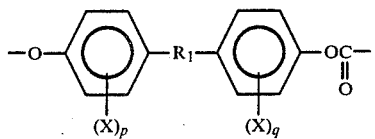

wherein R represents a divalent aliphatic, alicyclic, or phenyl-substituted alkylidene group each having 1 to 15 carbon atoms, or —O—, —S—, —SO—, —SO$_2$—, or —CO—; R$_1$ is an aliphatic organic group represented by —CH(CH$_3$)—CH$_2$—C(CH$_3$)$_2$—, —C(CH$_3$)=CH—C(CH$_3$)$_2$—, —C(=CH$_2$)—CH$_2$—C(CH$_3$)$_2$—, —CH(CH$_3$)—CH=CH—, or CH(CH$_3$)—CH$_2$—CH$_2$—; X represents a halogen atom or a lower alkyl group, and p and q each represents an integer of 0 to 2.

2. A copolycarbonate resin as in claim 1, wherein the constituting unit of the formula B is in a proportion of 5 to 50 mol%.

3. A copolycarbonate resin as in claim 1, wherein R is —C(CH$_3$)$_2$— and p and q are both 0 in the formula A.

4. A copolycarbonate resin as in claim 2, wherein R is —C(CH$_3$)$_2$— and p and q are both 0 in the formula A.

* * * * *